Fig. 3
Fig. 4

INVENTORS
JOSEPH B. ARMITAGE
THEODORE F. ESERKALN
By W. D. O'Connor
ATTORNEY

Jan. 15, 1946.  J. B. ARMITAGE ET AL  2,392,964
AUTOMATIC INDEXING MECHANISM
Filed July 26, 1943  4 Sheets-Sheet 4

INVENTORS
JOSEPH B. ARMITAGE
THEODORE F. ESERKALN
BY W. D. O'Connor
ATTORNEY

Patented Jan. 15, 1946

2,392,964

UNITED STATES PATENT OFFICE 2,392,964

AUTOMATIC INDEXING MECHANISM

Joseph B. Armitage and Theodore F. Eserkaln, Wauwatosa, Wis., assignors to Kearney & Trecker Corporation, West Allis, Wis., a corporation of Wisconsin Application July 26, 1943, Serial No. 496,160

5 Claims. (Cl. 90—56)

This invention relates, generally, to indexing mechanisms and more particularly to improved indexing apparatus for use in connection with the working elements of machine tools.

A general object of the invention is to provide an improved automatic indexing mechanism for indexing a work holding or tool holding element of a machine tool.

Another object of the invention is to provide an improved indexing mechanism capable of rapid and independent operation in indexing a machine tool element.

Another object of the invention is to provide a self-contained indexing mechanism for use with a machine tool that is arranged to be operated by power independently of the machine tool driving mechanism.

Another object of the invention is to provide an improved indexing arrangement for use with a machine tool that is especially adapted to operate with minimum delay and with minimum lost motion in effecting a machining cycle.

Another object is to provide an improved work holding fixture for a machine tool including a self-contained motor arranged to effect indexing movements of a work piece for presentation to a cutter.

Another object is to provide a new and improved work fixture including an indexable work support and a transmission mechanism driven by an electric motor incorporated in the fixture and operable independently of the machine transmission to effect indexing movement of the work support.

Another object is to provide a new and improved work fixture including an indexable work support and a power source operative independently of the machine transmission for effecting indexing movement of the work support under either manual or automatic control.

Another object is to provide an improved indexing work fixture adapted to be arranged in multiple on a machine tool for simultaneous tripping operation.

Another object is to provide an improved indexing apparatus in which tripping mechanism is arranged to become inactive during an indexing movement to obviate the possibility of effecting an unintended continuing or repeated indexing movement.

Another object is to provide an improved tripping mechanism for an indexing apparatus that becomes inactive subsequent to a tripping action and that does not become effective for initiating a subsequent indexing movement until after the completion of the previous indexing movement.

Another object is to provide an indexing mechanism in which an actuating element operates through a predetermined cycle in effecting an indexing movement, the extent of the movement being regulated by adjustment of the actuating mechanism.

Another object is to provide an indexing mechanism in which initiation of an indexing movement is effected by a double movement of a tripping device.

Another object is to provide an indexing device in which a cyclic actuator functions to discontinue the indexing movement and re-establish the effectiveness of tripping mechanism at the completion of a cycle.

According to this invention, a self-contained indexing apparatus for use with a machine tool is provided with a separate power source arranged to effect rapid indexing movements independently of movement of other machine elements. To this end, the mechanism is provided with a motor driven actuator arranged to be moved through a complete cycle for each indexing movement. The actuator is rendered operative by tripping a latch which is re-engaged at the end of a cycle and operates to stop the movement. When the latch is tripped it becomes disengaged from its stripping mechanism and is not re-engaged until the indexing cycle is completed thereby preventing the indexing movement from being continued by a tripping action occurring during indexing. The tripping mechanism is so arranged that a double movement is required to trip the latch, a spring acting to effect the final movement. The extent of the indexing movement may be regulated by interchanging indexing plates and by adjusting a shroud arranged to regulate the effective area of the indexing plate. A plurality of indexing mechanisms may be used in multiple by interconnecting their trip mechanisms for simultaneous operation.

The foregoing objects of the invention, and others which will become apparent as the following description proceeds, may be achieved by the particular work fixture depicted in and described in connection with the accompanying drawings, in which.

The improved indexing arrangement provided by the present invention is particularly useful in connection with machine tools for effecting successive indexing movements of working elements such as those adapted to support work pieces or cutting tools. The particular embodiment of the invention set forth herein as illustrative of a practical operative structure, is a work holding fixture especially adapted for indexing work pieces to present successive elements for machining.

The work holding fixture shown in the drawings may be utilized with any machine tool presenting a suitable supporting structure for the fixture and having a cutting tool adapted to perform a machining operation on a work piece supported for indexing movement on the fixture.

Figure 1:
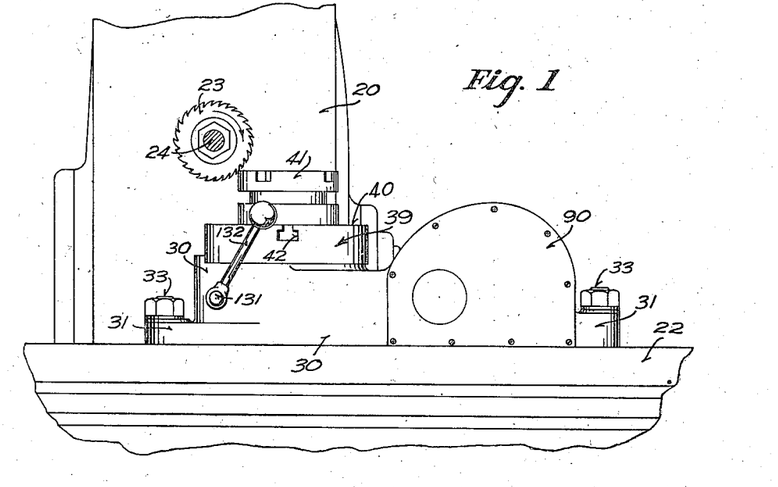
Figure 1 is a fragmentary view in front elevation showing part of a milling machine provided with an indexing fixture constructed in accordance with the present invention.
Figure 2:
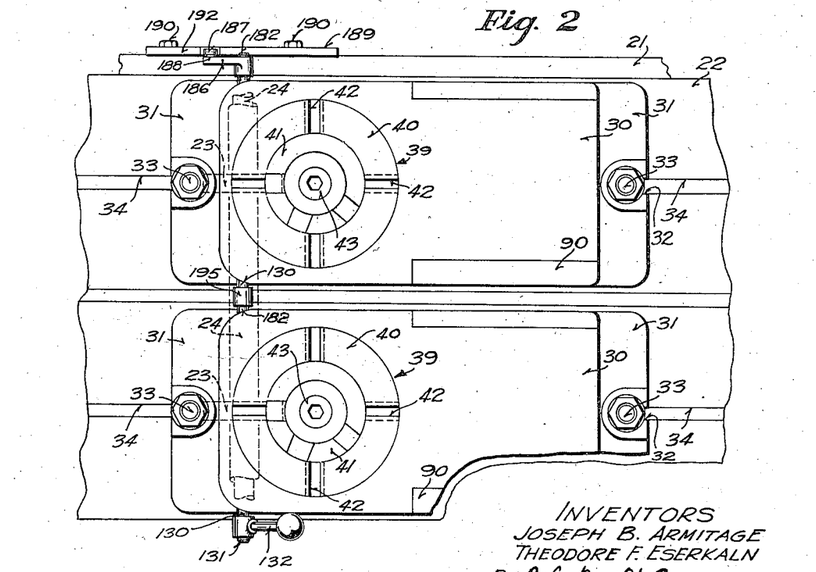
Fig. 2 is a fragmentary top plan view of a portion of the work supporting table and saddle of the milling machine, showing a pair of work fixtures arranged for effecting gang milling and for automatic indexing simultaneously under the control of a single element.

The particular machine tool chosen for illustrative purposes, a portion of which is shown in Figs. 1 and 2 of the drawings, is a conventional horizontal knee type milling machine. The machine comprises essentially an upstanding column 20 having ways formed upon its face to guide a knee slidably mounted for vertical adjustment thereon. The knee carries a saddle 21 mounted for horizontal movement toward and from the face of the column 20. The saddle in turn carries a transversely movable table 22 that may be driven in longitudinal feeding movements by the usual transmission mechanism. The relative adjustments provided between the column, knee and saddle permit required movements of the machine parts to properly position the table, fixture and work piece in desired relationship with a cutter 23 carried by an arbor 24 secured to the usual spindle (not shown) that is rotatably supported in the column 20 above the table 22 and driven in any conventional manner.

The machining operation for which the fixture herein set forth as an exemplifying embodiment of the present invention is particularly adapted, is that of forming a series of equally spaced cuts or slots in a work piece. The particular operation chosen to illustrate a practical application of the present invention is that of cutting clutch teeth in the respective ends of a clutch sleeve.

Figure 4:
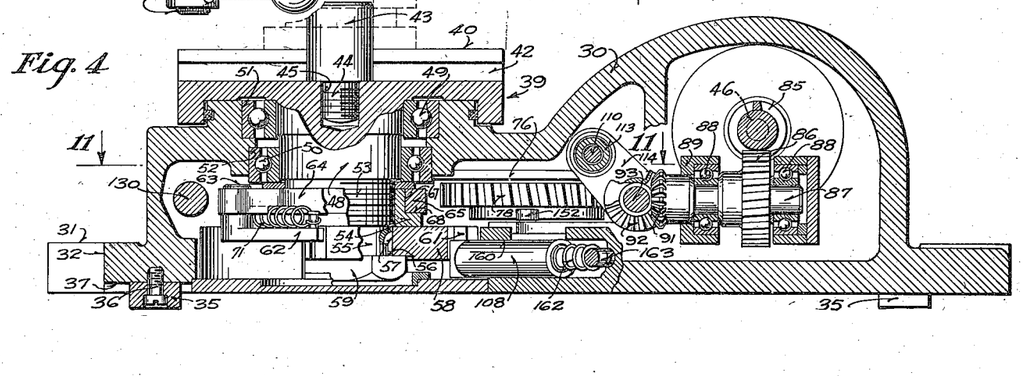
Fig. 4 is a view in vertical longitudinal section taken substantially on the planes represented by the lines 4—4 in Fig. 3 and showing the indexable work support together with portions of the transmission mechanism.

The work fixture shown for illustrative purposes in connection with the machine tool in the accompanying drawings, comprises a body portion 30 including a pair of end flanges 31 provided with slots 32 adapted to receive anchoring bolts 33 cooperating with conventional T-slots 34 in the surface of the machine table 22 for securing the fixture to the table in any desired position of longitudinal adjustment. For the purpose of positioning the fixture squarely with respect to the plane of rotation of the cutter 23, a pair of positioning blocks or keys 35, shown in Fig. 4, are secured by cap screws 36 within suitable aligned slots 37 formed in the lower surface of the body portion 30 and adapted to fit in one of the T-slots 34 of the table 22.

The body portion 30 of the fixture is formed hollow to provide space for receiving the various operating mechanisms for effecting the indexing movements. In general, the fixture provides a self-contained power operated work indexing apparatus including a power source in the form of an electric motor 38, shown in Fig. 3, and an indexable working element or support 39 arranged to be actuated by the motor 38 independently of the table driving transmission mechanism in a manner to provide for effecting rapid indexing movements without requiring a corresponding additional movement of the table.

As shown, the indexable work support 39 is mounted adjacent to one end of the fixture and includes an indexable work supporting surface or table 40 provided with appropriate means for retaining a work piece 41 in proper position thereon. The work piece 41 may be releasably retained on the work support by means of clamping bolts fitted in suitable T-slots 42 formed in the top surface of the table or it may be applied to a mandril 43 having a threaded shank 44 secured in a centrally disposed threaded aperture 45 formed in the indexable work support 40. In the present instance, the mandril type of mounting for releasably retaining the work piece 41 in proper position on the work support 40 serves to speed up machine production in that no additional clamping of the work piece is required when the slotting operation is performed under the climb cutting method of milling, wherein the cutting pressure of the tool serves to retain the work piece solidly against the surface of the table.

The power source, in the form of the electric motor 38, is housed within the body portion 30 of the fixture adjacent the end thereof opposite that occupied by the table 40. The electric motor 38 is provided with an armature shaft 46 journalled in suitable bearings 47 (only one of which is shown). When the fixture is in use, the motor 38 is operated continuously and is selectively coupled by means of a transmission mechanism to effect intermittent indexing movements of the work support 39 in a manner hereinafter more specifically described.

The movable work support 39 includes a depending hub 48 journalled for rotary movement in a pair of spaced bearings 49 and 50 mounted respectively in bores 51 and 52 formed in the upper wall of the body portion 30. The hub 48 of the work support 39 is provided with a reduced portion 53 adapted to serve as a mounting means for an internally threaded collar 54 on which a portion of the indexing mechanism may be mounted. The hub 48 of the work support is further provided with another reduced portion 55 having an axially disposed keyway 56 adapted to receive a locking key 57 which serves to retain an indexing plate 58, receivable thereon, in fixed relationship with the indexable work support 39. The entire bottom assembly of the work support is retained in proper position upon the hub 48 by means of a nut 59 applied to the lower threaded end of the hub 48.

The indexing plate 58 is provided with a plurality of indexing notches or grooves 61 arranged in spaced relationship about its periphery. The indexing plate may be one selected from a series of plates having different numbers of notches, the selection of a particular plate being dictated by the number and spacing of slots or operations that are to be effected upon the work piece. Since these plates are interchangeable, any desired number of indexing movements may be provided for within the limits of the indexing plates at hand.

Figure 5:
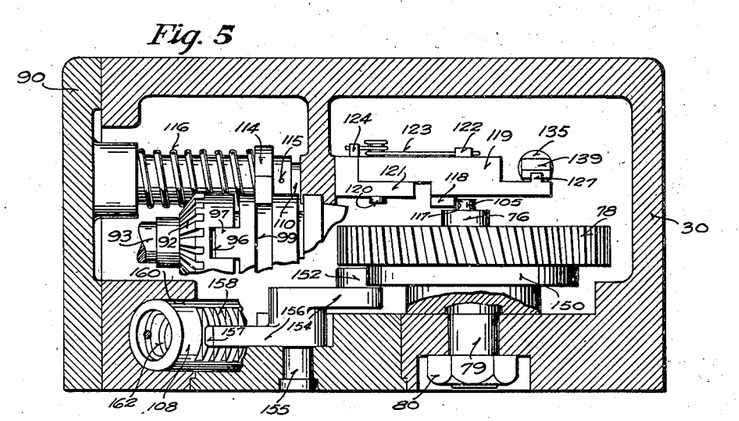
Fig. 5 is a view in vertical transverse section taken substantially on the planes represented by the lines 5—5 in Fig. 3 and showing a portion of the indexing transmission mechanism.
Figures 11, 12, 13, 14:
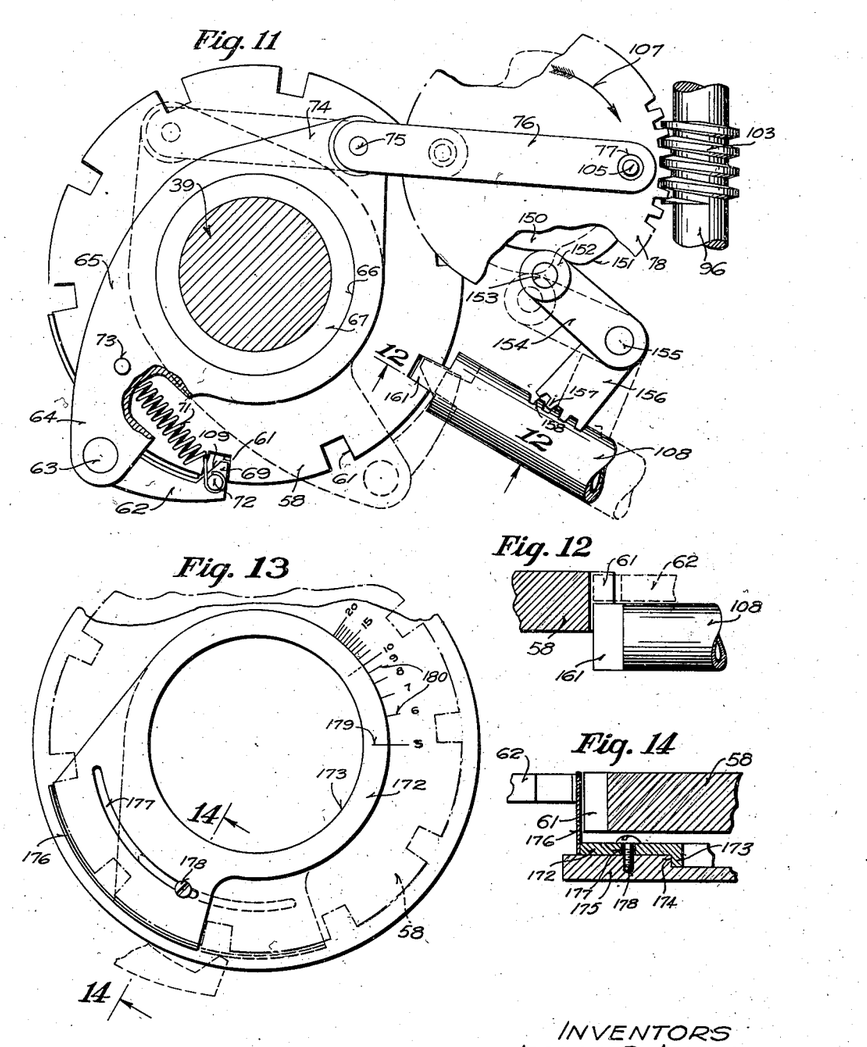
Fig. 11 is an enlarged view in horizontal section taken substantially on the plane of the line 11—11 in Fig. 4 and showing the indexing plate and the associated indexing latching mechanism.
Fig. 12 is a detail sectional view taken substantially on the plane of the line 12—12 in Fig. 11 and showing the engagement between the latching plunger and a notch in the indexing plate.
Fig. 13 is a fragmentary top plan view showing the selector plate for adjusting the effective stroke of the indexing mechanism.
Fig. 14 is an enlarged detail sectional view taken substantially on the plane of the line 14—14 in Fig. 13 and showing a shroud on the selector plate for adjusting the effective stroke of the indexing pawl.

The indexing mechanism for effecting successive steps of indexing movement of the work support is best shown in Fig. 11 and includes an indexing pawl 62 that is rockably mounted on a pin 63 supported in an arm 64 projecting from a yoke 65 having a central bore 66 adapted to be journalled for oscillating movement on a hub 67 and shoulder 68 of the collar 54 mounted on the reduced portion 53 of the hub 48. The free end of the pawl 62 is in the form of a tooth 69 adapted to be received within any one of the notches or grooves 61 formed in the indexing plate 58. A tension coil spring 71 serves to normally urge the pawl 62 toward the center of the indexing plate 58. This action is accomplished by reason of the fact that the ends of the tension spring 71 are secured, respectively, to a pin 72 mounted on the free end of the pawl 62 and a pin 73 mounted in the arm 64 of the yoke 65. Another arm 74 on the yoke 65, disposed in approximately diametrically opposite relationship with the arm 64, is provided with a pin 75 which serves as a rockable mounting for one end of a connecting link 76 that serves as a driver for effecting oscillatory movement of the yoke 65. The other end of the link 76 is mounted on a crank pin 77 carried by a worm wheel 78 journalled for rotating movement on a pin 79 anchored in the body portion 30 of the fixture by means of a nut 80, as shown in Fig. 5.

Figure 3:
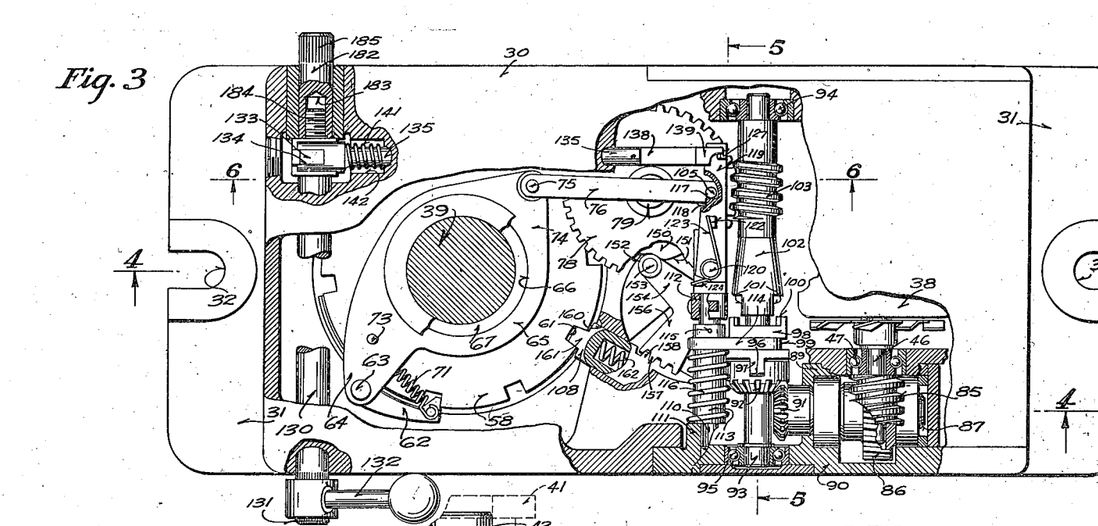
Fig. 3 is a top plan view of the fixture shown in Figs. 1 and 2, parts having been broken away to disclose portions of the actuating mechanism and the control elements for automatically operating the indexing mechanism.

A selectively connectible power transmission mechanism serves to couple the motor 38 with the worm wheel 78, as shown in Figs. 3 and 4, to effect indexing movement of the work support in accordance with the operation of associated control mechanism. The transmission mechanism includes a worm 85 secured to the armature shaft 46 of the motor. The worm 85, constantly driven by the motor, meshes with and drives a worm wheel 86 fixed to a shaft 87 journalled in suitable bearings 88 mounted within bosses 89 formed integral with a side cover plate 90 secured to the body portion 30 in any suitable manner, such as by cap screws. A bevel gear 91, also fixed to the shaft 87, meshes with and drives a mating bevel gear 92 that is freely rotatable on a shaft 93 mounted in suitable bearings 94 and 95, respectively carried by the body portion 30 and cover plate 90 of the fixture. A radially disposed slot 96 formed in the body portion of the gear 92 is arranged to receive lugs 97 formed on one end of a clutch collar 98 that is slidably mounted on the shaft 93 and includes a centrally disposed annular shifter fork receiving groove 99 and a plurality of clutch teeth 100 arranged at the end of the collar opposite the lugs 97. The clutch sleeve 98 is slidable on the shaft 93 to provide for selective driving engagement between the teeth 100 and similar complementary clutch teeth 101 formed on the face of an enlarged central portion 102 of the shaft for controlling its rotation. The shaft 93 is also provided with a worm 103 which meshes with the worm wheel 78 to complete the transmission from the power source 38 to the indexing mechanism, that is operative to effect movement of the work support 39.

In performing an indexing operation, the clutch sleeve 98 is moved to engaged position and is held in this position while the worm wheel 78 makes one full revolution, the clutch then being disengaged automatically. The worm wheel 78 turns in clockwise direction, as indicated by the arrow 107 in Fig. 11, and as it begins its turning movement, the connecting link 76 causes the yoke 65 to pivot in counterclockwise direction about the hub 67. The pawl 62 on the arm 64 of the yoke 65 moves along the periphery of the indexing plate 58 until it engages one of the notches 61 of the plate under action of the spring 71 whereupon the plate and the movable work support 39 are then advanced through an indexing movement. As the worm wheel 78 completes one-half of a revolution, the indexing plate 58 and the work support 39 are brought to the new indexed position. When the indexing plate arrives at its new position, it is retained thereby a spring pressed latching plunger 108 which enters the indexing notch 61 below the pawl 62, as shown in Fig. 12. As the wheel 78 continues to turn, the yoke is pivoted in clockwise direction to return it to its initial position and the tooth 69 of the pawl 62 is withdrawn from the indexing notch 61 by reason of a sloping surface 109 presented by the back of the tooth which permits it to ride out of the notch in opposition to the force of the spring 71, the indexing plate being held from turning by the plunger 108. When the worm wheel 78 completes a full revolution, the yoke 65 is returned to its initial position with the pawl 62 poised in readiness to engage a successive indexing notch 61 in performing a subsequent indexing operation.

Suitable clutch operating mechanism is provided to effect the engagement and disengagement of the teeth 100 on the clutch collar 98 with the teeth 101 formed on the shaft 93 under control of associated tripping mechanism. This clutch actuating mechanism comprises a shaft 110 slidably mounted for axial movement parallel with the shaft 93 in bearings 111 and 112, respectively carried by the cover plate 90 and the body portion 30. A sleeve member 113 encircling the shaft carries a clutch shifting fork 114 which engages the groove 99 formed in the clutch collar 98. The sleeve 113 is anchored to the shaft 110 by means of a pin 115 which serves to secure the fork 114 in operating relationship with the shaft 110 and also to prevent rotary movement of the shaft 110 with respect to the fork 114. A coil spring 116 surrounding the sleeve 113 and having its ends abutting the bearing 111 and the fork 114 respectively, serves to normally urge the clutch sleeve 98 toward its engaged or driving position.

With the mechanism in the position shown in Figs. 3 and 5, the clutch 98 is retained in disengaged position by reason of contact between a stop pin 105 formed on the end of the crank pin 77 carried by the worm wheel 78 and a face or abutment 117 formed on an ear 118 projecting downwardly from the bottom surface of a latch arm 119 that is pivotally mounted for rockable movement in a horizontal plane on a pin 120 anchored upon a square portion 121 of the shaft 110. The arm 119 carries a lug 122 on its upper surface to form an abutment for one arm of a coil torsion spring 123 which surrounds the upper portion of the pin 120 and has its other end in pressure contact with a lug 124 carried by the square portion 121 of the shaft 110. This torsion spring 123 normally urges the arm 119 to the position of alignment with the shaft 110, as shown in Figs. 3 and 8, wherein further movement of the arm to the right is limited by abutting contact between a face 125 formed on the arm 119 and a face 126 formed on the squared portion 121 of the shaft 110.

Figures 6, 7, 8, 9, 10:
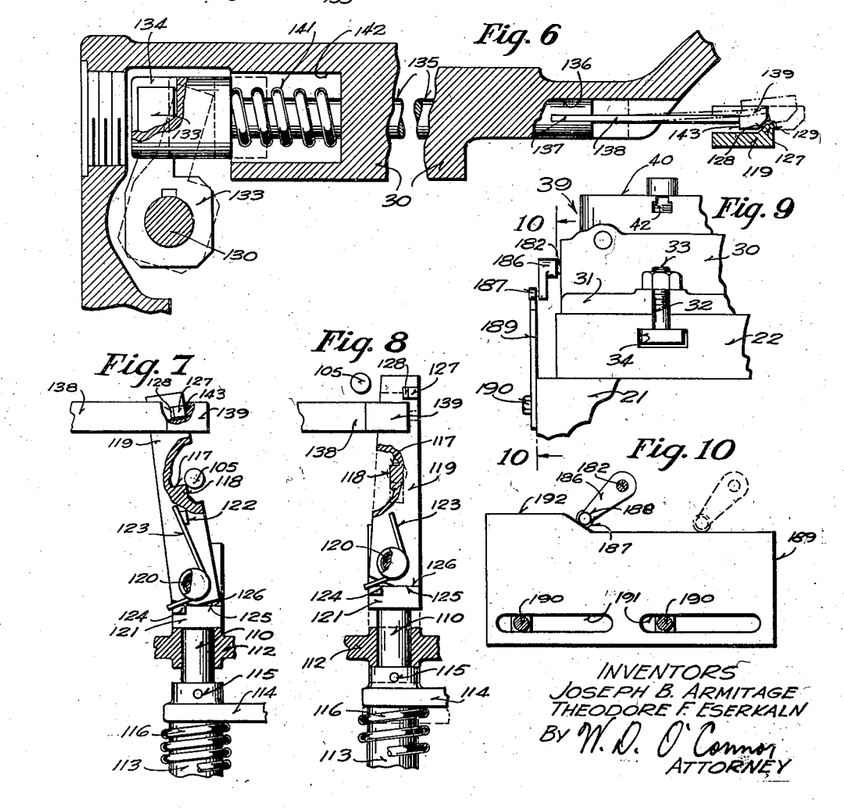
Fig. 6 is a fragmentary view in vertical longitudinal section taken substantially on the plane of the line 6—6 in Fig. 3 and showing the control element and its associated tripping means for effecting indexing movements of the work support.
Fig. 7 is an enlarged fragmentary top plan view of a portion of the tripping mechanism shown in Fig. 3, indicating the relative position of the parts thereof at the instant of tripping to effect engagement of the transmission mechanism.
Fig. 8 is a view similar to Fig. 7 showing the relative position of the tripping mechanism during the indexing operation, the dotted lines indicating the position of the parts in effecting automatic disengagement of the indexing transmission mechanism upon completion of an indexing movement.
Fig. 9 is a fragmentary end elevational view of the saddle and table of the milling machine showing a cam and follower for effecting automatic operation of the control element.
Fig. 10 is a view in vertical section taken substantially on the planes indicated by the lines 10—10 in Fig. 9 and illustrating the cooperating relationship of the cam and cam follower to effect movement of the control element.

To initiate an indexing movement, the arm 119 may be pivoted to the left against the action of the spring 123 to the position shown in Fig. 7 for moving the depending ear 118 out of engagement with the stop pin 105 on the worm wheel 78. When this occurs, the coil spring 116 is free to move the shaft 110 rearwardly and it in turn moves the clutch collar 98 to its engaged position, whereupon the worm wheel 78 starts to rotate and the stop pin 105 advances out of the path of the ear 118 on the arm 119. The arm may then be returned by the spring 123 to its initial aligned position without having any effect upon the operation of the clutch 98.

As the worm wheel 78 completes a full revolution in effecting an indexing movement as previously explained, the pin 105 will again engage the face 117 of the ear 118 and will move the arm 119 and the clutch actuating sleeve 113 forward against the opposition of the coil spring 116 to a position in which the clutch sleeve 98 is disengaged, thereby stopping rotation of the worm wheel 78. The clutch will then remain disengaged until the arm 119 is again tripped out of engagement with the stop pin 105 to permit the coil spring 116 to re-engage the clutch in initiating a subsequent indexing operation.

To provide for effecting tripping movement of the arm 119, there is fitted at its outer end, an upstanding tripping lug 127. As shown in Figs. 6, 7 and 8, the tripping lug presents an inclined cam surface 128 at one side and a perpendicular tripping surface or abutment 129 at the other side to adapt it to be overridden and engaged by a cooperating tripping element.

The tripping mechanism which is provided to engage the tripping lug 127 for effecting disengagement of the surface 117 on the arm 119 from the pin 105, includes a control shaft 130 that is journalled for rocking movement in the body portion 30 of the fixture adjacent the table end thereof. The control shaft 130 is provided with a serrated outer end 131 adapted to receive and releasably retain the hub of an operating handle 132. Adjacent to its inner end, the control rod 130 is provided with a trip rod operating arm 133 which is keyed to the control rod for turning movement with it. The arm 133 extends upwardly and its end engages in a slot 134 formed in the outer enlarged end of a tripping rod 135 slidably mounted for axial movement in a bore 136 formed in the body portion 30 of the fixture. The inner end of the rod 135 is provided with a horizontally disposed slot 137 adapted to receive one end of a flat spring element 138 which may be secured within the slot 137 in any well-known manner such as by welding. Secured to the outer or free end of the spring 138 is a tripping element 139 that is shaped to cooperate with the lug 127 on the arm 119, as shown in Fig. 6.

The entire tripping rod assembly is normally retained in inactive or retracted position by means of a coil spring 141 housed within a recess 142 formed in the body portion 30 of the fixture. One end of the coil spring 141 contacts the base of the recess 142 and the other end thereof abuts the shoulder formed at the juncture of the enlarged end with the uniform portion of the rod 135. Manual operation of the tripping mechanism may be effected by moving the handle 132 in a clockwise direction (see Fig. 1) to effect a rocking action of the control shaft 130 and thereby cause the tripping rod 135 to move inwardly under the action of the arm 133 and against the pressure of the coil spring 141. The inward movement of the tripping rod 135 will result in the tapered forward end of the tripping element 139 riding upwardly as it passes over the tripping lug 127 carried by the arm 119, the flat spring 138 permitting sufficient deflection to allow the tripping element 139 to pass over the cam surface 128 of the lug 127.

When the tripping element 139 has passed over the lug 127 to the dotted position shown in Fig. 6, the spring 138 will return to its normal position wherein a perpendicular operating surface or abutment 143 of the tripping element will be disposed adjacent to the corresponding abutment portion 129 of the tripping lug 127. This relationship will persist as long as the operating handle 132 is retained in its clockwise position. Immediately upon release of the retaining pressure upon the handle 132, the coil spring 141 will effect a return movement of the tripping rod 135 to its normally inactive position. During this movement, the surface 143 of the tripping element 139 will act upon the surface 129 of the tripping lug 127 to effect a rocking action of the arm 119 against the action of the relatively light torsion spring 123 to move the abutment surface 117 of the lug 118 free from abutting contact with the stop pin 105 carried by the worm wheel 78.

When the lug 118 moves out of engagement with the stop pin 105, the coil spring 116 moves the clutch sleeve 98 into engagement as previously explained and, at the same time, moves the arm 119 toward the rear of the fixture, as shown in Fig. 8, thereby displacing the tripping lug 127 from the line of action of the tripping element 139 on the end of the spring 138. This has the effect of preventing unintended occurrence of continuing or false indexing, since with the lug 127 in displaced position, the tripping mechanism can have no effect upon the pivoted arm 119 and consequently, manipulation of the tripping mechanism cannot shorten or lengthen the extent of the indexing movement. Since the tripping mechanism cannot engage the lug 127, it cannot move the arm 119 and the ear 113 out of the path of rotation of the stop pin 105. As previously explained, the indexing movement of the work piece is completed in the first half revolution of the worm wheel 78. No further indexing movement can be effected, regardless of the position assumed by the indexing mechanism, until after the second half revolution of the worm wheel 78 has been completed and the stop pin 105 has engaged the lug 118 on the arm 119 and has moved the arm forward to disengage the clutch 98 and reposition the tripping lug 127 in the line of action of the tripping element 139.

In initiating an indexing movement, it is first necessary to release the rotatable work support 39 by disengaging the latching plunger 108 from the indexing notch 61 in the indexing plate 58. The latching plunger actuating mechanism comprises a cam 150 positioned immediately below the worm wheel 78 and preferably formed integrally therewith. The cam 150 is provided with a lobe 151 which extends substantially half way around the peripheral surface of the cam. With the mechanism in the position shown in Figs. 3, 5 and 11, a cam follower 152 rotatably mounted on a pin 153 carried by one arm of a bell crank 154 is normally in contact with the ineffective or inner portion of the cam 150. It will be noted from reference to Figs. 3 and 11 of the drawings that the cam follower 152 is about to ride up onto the lobe 151 of the cam immediately upon the initiation of rotary movement to the worm wheel 78. As the worm wheel 78 and cam 150 begin rotation, the action of the follower 152 will cause the arm of the bell crank 154 to rock upon its pivot pin 155 and impart a similar rocking action to an arm 156 of the bell crank which is provided with segmental gear teeth 157 formed along its outer edge. The segmental gear teeth 157 mesh with a rack 158 formed on the latching plunger 108 which is slidably mounted for longitudinal movement in a bore 160 formed in the body portion 30 of the fixture. The plunger 108 is provided with a latching or indexing tooth 161 for latching engagement with one of the notches 61 formed in the peripheral surface of the indexing plate 58. The latching tooth 161 is normally retained in contact with a notch 61 by the action of a coil spring 162 housed within the body of the plunger 108 and abutting against a stud 163 that passes transversely through the bore 160. The action of the coil spring 162 also retains the cam follower 152 in contact with the surface of the cam 150.

The initial rotating movement of the cam 150 and the worm wheel 78 effects prompt operation of the actuating mechanism to release the latching engagement between the tooth 161 and the notch 61 by retracting the latching plunger under the action of the cam follower 152 and against the action of the coil spring 162 to permit the indexing mechanism to operate. It will be noted that the initial movement of the worm wheel 78 effects a lateral displacement of the connecting link 76 rather than a forward movement thereof. This is due to the position of the crank pin 77 upon the line of action through the center of the worm wheel 78. As the worm wheel 78 continues to rotate, the indexing yoke 65 will be rocked to effect a counterclockwise indexing movement of the pawl 62 as previously explained, under the action of the link 76. The actual indexing movement then proceeds through approximately one-half revolution of the worm wheel 78, after which the cam follower 152 will ride off of the lobe 151 and permit the latching plunger 108 to return the latching tooth 161 into latching engagement with the newly indexed notch 61 of the indexing plate 58.

Since the indexing yoke 65 moves through a fixed arc of action when it is pivoted by the link 76 during a revolution of the worm wheel 78, in order to effect a small indexing movement arrangements are provided for adjusting the effective length or operating portion of the stroke. This is accomplished in this instance by providing a shield or shroud arranged to cover a selected portion of the periphery of the indexing plate 58 to prevent the indexing pawl 62 from engaging a notch 61 in the plate until after it has moved through a predetermined portion of the oscillating movement, the remaining portion of the stroke serving to effect the actual indexing movement.

The stroke adjusting means for controlling the effective movement of the indexing pawl 62 comprises a ring element 172 shown in Figs. 13 and 14 and having a depending flange 173 adapted for sliding rotary contact with the circular wall 174 of a recess formed in a cover plate 175 adapted to be removably retained on the under surface of the body portion 30 of the fixture in any approved manner (not shown). The ring element 172 is provided with an upstanding flange or shroud element 176 along a portion of its marginal edge. The flange 176 is arcuate in shape and is arranged to lie in conforming relationship with the peripheral surface of the index plate 58. The ring 172 is also provided with an arcuate slot 177 disposed concentrically with the side wall 174 of the central recess formed in the plate 175. The arcuate slot 177 serves to receive a screw 178 which is in threaded engagement with a tapped hole formed in the plate 175. The screw and slot cooperate to permit the releasable retention of the ring element 172 and the upstanding flange 176 in adjusted angular position with respect to the notched periphery of the index plate 58.

For the purpose of effecting ready adjustment of the position of the flange 176 with respect to the notches 61 formed in the periphery of the index plate 58, a scribe line 179 is provided upon the ring element 172 to be read against a scale 180 disposed on the plate 175 adjacent to the peripheral surface of the ring 172 to provide a visual indication for facilitating the proper adjustment of the flange 176 so that the desired number of indexing movements may be effected upon the work piece for each complete revolution thereof.

Referring specifically to Figs. 11 and 13 the particular indexing plate 58 there shown is provided with ten notches. With the ring 172 and flange 176 in the position indicated in full lines, the normal operation of the indexing mechanism will effect five separate indexing movements of the work piece for each complete revolution, since the pawl 62 moves through a stroke sufficiently long to engage every other notch. With the ring moved to the position shown in dotted lines in Fig. 13 the flange 176 covers one of the notches 61 in a manner to render this particular notch ineffective. As the pawl 62 returns to its normal position, as indicated in dotted lines in Fig. 13, it rides up on the outer surface of the flange 176 in a manner to preclude the introduction of the pawl tooth 69 into the notch 61 which is covered by the flange. When the indexing movement of the pawl is initiated, the pawl remains ineffective over this portion of its stroke during which it rides up on the surface of the flange 176 in a manner to reduce its effective indexing stroke the desired amount, whereby a greater number of indexing operations will be required to effect a single revolution or complete cycle of operation upon the work piece. With the particular index plate 58 shown in Fig. 13 and with the stroke adjusting mechanism in the position indicated in dotted lines, it will be noted that ten indexing movements will be imparted to the work piece in place of the five movements which would normally be imparted to it with the stroke adjusting mechanism in the position indicated in full lines in this figure, since the pawl 62, in this instance, engages each of the ten indexing notches successively.

In order to adjust the indexing mechanism for establishing a desired indexing movement, the cover plate 175 is first removed to expose the indexing plate 58. The nut 59 may then be unscrewed, thereby releasing the indexing plate 58 to permit substitution of another plate having the appropriate number of notches. After the new indexing plate has been secured in place, the ring element 172 is adjusted to place the flange or shroud 176 in position to cover the required number of notches, as indicated by the scale 180, and secured to the cover plate by tightening the screw 178. The cover plate is then replaced on the bottom of the fixture body 30 with the flange 176 in the predetermined position relative to the indexing plate after which the mechanism may be operated to effect the new indexing movement.

Automatic operation of the tripping mechanism to effect the engagement of the indexing clutch in response to movement of the work table 22 is provided. The apparatus may be arranged for this form of trip actuation by fitting a tripping sleeve 182 (see Fig. 3) having a threaded axial bore 183, upon a reduced threaded end 184 of the control shaft 130. The outer extremity of the sleeve 182 extends beyond the surface of the body portion 30 of the fixture and is provided with a serrated surface 185 adapted to releasably retain the hub of a tripping arm 186 (see Fig. 2) which carries a cam follower 187 rotatably mounted on a pin 188 adjacent to the outer or free end of the arm 186. As best shown in Figs. 9 and 10, the cam follower 187 is adapted to ride on the top edge of a plate cam 189 that is adjustably secured to the saddle 21 of the machine tool by cap screws 190 which extend through slots 191 formed in the cam plate to permit lengthwise adjustment thereof. The cam plate 189 is provided with an elevated portion 192 effective upon the cam follower 187 to cause a rocking action of the control shaft 130 in a manner and for the purpose previously described in connection with the manual control of the tripping mechanism.

Simultaneous gang milling of a plurality of work pieces individually mounted on the work supports 40 of separate fixtures may be effected as shown in Fig. 2 by operatively connecting the tripping control shafts 130 of adjacent fixtures by means of a coupling sleeve 195 fitted upon the adjacent serrated ends 131 and 185 of the shafts 130 to provide a means for effecting simultaneous operation of the separate indexing mechanisms contained in the two fixtures. The coupled trip control shafts 130 may then be actuated simultaneously either manually or automatically, in the manner previously described.

In performing a machining operation on a milling machine equipped with the improved indexing fixture embodying the present invention, the work table 21 is advanced to the left at feed rate in the usual manner to bring the work piece 41 into engagement with the cutter 23. As the work piece approaches the cutter, the cam follower 187 rides up on the elevated portion 192 of the plate cam 189, thereby pivoting the control shaft 130 in direction to compress the coil spring 141 on the rod 135 and to move the tripping element 139 into latching engagement with the lug 127 on the arm 119. During the progress of the cutting operation, the cam follower remains on the elevated portion 192 of the cam, thereby preventing return movement of the shaft 130 in a tripping action and obviating the possibility of an indexing movement occurring while the work piece is engaged with the cutter.

After the cutter 23 has completed the cutting operation upon the work piece 41, the usual table tripping mechanism is actuated to cause automatic reversal of the table movement for withdrawing the work piece from the cutter, preferably at rapid traverse rate. The plate cam 189 is preferably so adjusted in position on the saddle 21 that just as the work piece 41 clears the cutter 23 on the return stroke, the cam follower 187 goes down onto the lower portion of the cam. This permits the control shaft 130 to turn under action of the spring 141 to trip the indexing mechanism. As previously explained, when the shaft 130 is freed for turning movement, the spring 141 moves the trip rod 135 in direction to pivot the arm 119 out of engagement with the stop pin 105 thereby permitting the clutch 98 to be engaged for starting the indexing movement and causing the tripping lug 27 to be moved back out of the path of action of the tripping element 139.

Since the indexing operation works independently of movement of the table, the table tripping mechanism may be adjusted to operate soon after the indexing mechanism is tripped for reversing the table feeding mechanism to cause it to again feed the work piece toward the cutter with very little lost motion or delay. As the work piece advances to the cutter and before it engages the cutter, the independent indexing movement is completed and the work support 39 is located in the new indexed position by engagement of the latching plunger 108 with a new notch of the indexing plate. Since the tripping lug 127 remains out of the path of movement of the tripping element 139 while the indexing movement is occurring, it is not possible to effect a second tripping action to cause the indexing movement to be repeated, which might otherwise occur accidentally and result in damage to the machine. As the indexing movement is completed, or slightly before it is completed, depending upon the setting of the cam and table trip mechanism, the cam follower 187 again rides up on the elevated portion 192 of the cam thereby compressing the spring 141 and causing the tripping element 139 to re-engage the tripping lug 127 as it moves back into engaging position at the termination of the indexing movement.

From the foregoing description of the construction and operation of a work holding fixture embodying the improved indexing mechanism provided by the present invention, it will be apparent that the new indexing mechanism is especially adapted to effect indexing movements expeditiously and independently of the movements of other machine elements and that it is arranged to prevent unintended indexing operations through rendering the tripping mechanism inoperative during an indexing movement.

Although the embodiment of the invention herein set forth as illustrative has been described in considerable detail for the purpose of making a full disclosure of a practical working structure embodying the invention, it is to be understood that the various novel features of the invention may be incorporated in other structural forms without departing from the spirit and scope of the invention as defined in the subjoined claims.

The principles of the invention having now been fully explained in connection with the exemplifying apparatus herein set forth, we hereby claim as our invention and discovery:

1. In an indexing mechanism, a base, a working member mounted for indexing movement on said base, an indexing plate presenting indexing openings arranged in predetermined manner and operatively associated with said working member, a locking plunger disposed to engage any one of the indexing openings of said plate for holding said working member in predetermined indexed position, an actuating wheel, a cam associated with said wheel and operative to withdraw said locking plunger from engagement with said indexing plate, means driven by said wheel including a pawl arranged to engage said indexing openings for effecting indexing movement of said member while said locking plunger is withdrawn, means including a shroud element adjustably positioned to prevent said pawl from entering selected indexing openings for adjusting the extent of the indexing movement effected by said wheel, power actuated means selectively engageable to turn said wheel, trip mechanism arranged to effect engagement of said power actuated means for turning said wheel, means associated with said wheel and operative to disengage said power actuated means after said wheel has turned through one revolution, and means associated with said trip mechanism to condition it for a subsequent tripping operation upon the completion of one revolution of said wheel, the arrangement being such that said trip mechanism is ineffective during rotation of said wheel and cannot be actuated to initiate a subsequent indexing movement until after said wheel has stopped at the termination of the previous indexing movement.

2. A repeating cycle indexing work fixture comprising a body portion for attachment to a support, an indexable work support carried by said body portion, a power source associated with said body portion, an indexing mechanism operatively associated with said indexable work support, a transmission mechanism driven from said power source and operatively connected to said indexing mechanism, a clutch in said transmission mechanism, a clutch operating member movable to effect engagement or disengagement of said clutch, said transmission mechanism being operative when said clutch is engaged to effect operation of said indexing mechanism, a clutch control means adapted to be rendered operative by movement of said indexing mechanism in a manner to effect movement of said clutch operating member to clutch disengaging position at the completion of each successive cycle of operation of said indexing mechanism, said clutch control means including a rockable latch member pivoted to said clutch operating member and arranged for limited rocking movement in one direction, means for normally retaining said rockable latch member in one extreme position to retain said clutch operating member in disengaged position by reason of contact of said member with a portion of said indexing mechanism, and a tripping mechanism operative only upon movement through a tripping stroke to disengage said rockable latch member from contact with said indexing mechanism to effect engagement of said clutch thereby rendering said transmission operative to initiate an indexing movement of said work support.

3. In an indexing mechanism, a base, an indexable member movably mounted on said base, an actuating element operative upon movement through a cycle to effect an indexing movement of said indexable member, a latching abutment carried by said actuating element, power operated driving means selectively effective to move said actuating element through a cycle to effect an indexing movement of said member, means to disconnect said power operated driving means including a resiliently urged clutch actuator, a latch pivotally mounted on said clutch actuator and disposed to be engaged by said latching abutment at the end of a cycle of movement and held thereby against resilient urging to restrain said clutch actuator in driving means disconnecting position, a tripping abutment carried by said latch, and a tripping finger movably mounted in position to engage said tripping abutment only when said latch is in driving means disconnecting position, the arrangement being such that when said tripping finger is moved in engagement with said tripping abutment, said latch is pivotally disengaged from said latching abutment and said clutch actuator is resiliently urged to power driving position, said tripping abutment being moved out of the path of movement of said tripping finger, whereby before said tripping finger again becomes effective, an indexing cycle must be completed and said clutch actuator and latch returned to driving means disconnecting position for engagement of said tripping abutment by movement of said tripping finger to initiate a subsequent indexing movement.

4. In an indexing mechanism, an indexable member, means to drive said indexable member including a wheel arranged to operate through one complete revolution in effecting an indexing movement, adjustable transmission mechanism operatively connecting said wheel to said indexable member and adapted to effect an indexing movement of predetermined extent, power-operated means for driving said wheel, a disengageable clutch arranged to connect said power-operated means to said wheel for driving it, an abutment on said wheel, a clutch actuating member biased to clutch engaging position, a latch carried by said clutch actuating member and arranged to be engaged by said abutment at the termination of an indexing operation to move said clutch actuating member to clutch disengaging position for stopping said wheel, and an indexing tripping mechanism adapted to engage said latch on said clutch actuating member only when it is in clutch disengaging position and operative to move said latch out of engagement with said abutment to permit movement of said clutch actuating member to clutch engaging position for initiating a subsequent indexing operation, said latch on said clutch actuating member moving out of operating relationship with said tripping mechanism as it moves to clutch engaging position and remaining out of operating relationship therewith until again moved by said abutment to clutch disengaging position.

5. In an indexing mechanism for a machine tool, a base, an indexable supporting element movably mounted on said base, a notched indexing plate operatively connected to said supporting element, an indexing pawl oscillatably mounted in cooperating relationship with said indexing plate for engaging the notches thereof to effect indexing movements, an indexing wheel rotatably mounted on said base, a connecting rod interconnecting said wheel and said indexing pawl in such manner that said pawl is moved through an indexing stroke for each revolution of said wheel, a power source mounted on said base for driving said wheel, a disconnecting clutch disposed to connect said power source to said wheel to drive it, a clutch actuating member, resilient means biasing said actuating member to clutch engaging position, a latch arm movably mounted on said actuating member, a stop pin carried by said indexing wheel, resilient means biasing said latch arm to a position in the path of movement of said stop pin for engagement by said stop pin at the end of an indexing cycle to effect disengagement of said clutch, and a tripping element disposed to be engageable with said latch arm only when it is in clutch disengaging position, said tripping element being movable to withdraw said latch arm from engagement with said stop pin to initiate an indexing cycle.

JOSEPH B. ARMITAGE.
THEODORE F. ESERKALN.